United States Patent
Gopal et al.

(10) Patent No.: US 7,758,785 B2
(45) Date of Patent: Jul. 20, 2010

(54) FIBER REINFORCED COMPOSITE AND METHODS OF FORMING THE SAME

(75) Inventors: Renuga Gopal, Singapore (SG);
Kazutoshi Fujihara, Singapore (SG);
Seeram Ramakrishna, Singapore (SG);
Chong-Lin Chew, Singapore (SG);
Ganesh V. Kumar, Singapore (SG);
Kelvin W. C. Foong, Singapore (SG);
Poey-Ling Loh, Singapore (SG)

(73) Assignee: National University of Singapore, Singapore (SG)

( * ) Notice: Subject to any disclaimer, the term of this patent is extended or adjusted under 35 U.S.C. 154(b) by 157 days.

(21) Appl. No.: 10/743,562

(22) Filed: Dec. 22, 2003

(65) Prior Publication Data

US 2005/0064170 A1 Mar. 24, 2005

Related U.S. Application Data

(60) Provisional application No. 60/436,466, filed on Dec. 27, 2002.

(51) Int. Cl.
*B29C 53/02* (2006.01)
*A61C 7/20* (2006.01)

(52) U.S. Cl. .............. 264/134; 264/137; 264/DIG. 71; 433/20

(58) Field of Classification Search .............. 428/331, 428/330, 337, 334, 20; 264/23, 36.19, DIG. 75, 264/230, DIG. 71, 134, 136, 137
See application file for complete search history.

(56) References Cited

U.S. PATENT DOCUMENTS

| 3,159,513 | A | * | 12/1964 | Baier | 156/49 |
| 3,164,888 | A | * | 1/1965 | Sharrow et al. | 29/598 |
| 3,608,052 | A | | 9/1971 | Gunn | |
| 3,650,864 | A | * | 3/1972 | Goldsworthy | 156/85 |
| 3,674,581 | A | * | 7/1972 | Kalnin | 156/84 |
| 4,076,377 | A | * | 2/1978 | Moraschetti | 385/116 |
| 4,379,802 | A | * | 4/1983 | Weaver et al. | 428/220 |
| 4,717,341 | A | * | 1/1988 | Goldberg et al. | 433/9 |

(Continued)

FOREIGN PATENT DOCUMENTS

FR 2815352 4/2002

(Continued)

OTHER PUBLICATIONS

Huang, Z.-M., R. Gopal, K. Fujihara, S. Ramakrishna, P.L. Loh, W.C. Foong, V.K. Ganesh, C.L. Chew, Fabrication of a new composite orthodontic archwire and validation by a bridging micromechanics model, Biomaterials, vol. 24 (2003) pp. 2941-2953.*

(Continued)

*Primary Examiner*—Matthew J. Daniels
(74) *Attorney, Agent, or Firm*—Dinsmore & Shohl LLP

(57) ABSTRACT

A fiber reinforced composite is formed using a shrinkable die. A composite of fiber and resin is placed in the die and is compressed by shrinking the die to form a desired transverse cross-section. Optionally, the die is bent along its lengthwise extent to shape the composite in the die. After shrinking and optional shaping, the composite is cured to form the fiber reinforced composite.

11 Claims, 5 Drawing Sheets

U.S. PATENT DOCUMENTS

| | | | | |
|---|---|---|---|---|
| 5,718,251 | A | * | 2/1998 | Gray et al. ............... 132/321 |
| 5,869,178 | A | * | 2/1999 | Kusy et al. ............... 428/335 |
| 5,904,803 | A | * | 5/1999 | Hillerich et al. ............ 156/494 |

FOREIGN PATENT DOCUMENTS

| | | | |
|---|---|---|---|
| JP | 58-082721 | | 5/1983 |
| JP | 01-222927 | | 9/1989 |
| JP | 01222927 | * | 9/1989 |
| JP | 03-067638 | | 3/1991 |
| WO | WO 02/30647 | * | 4/2002 |

OTHER PUBLICATIONS

Karmaker, AC; Dibenedetto AT; Goldberg AJ. "Continuous fiber reinforced composite materials as alternatives for metal alloys used for dental applications," J. Biomater Appl, 1997; pp. 318-328.

Jancar, J; Dibenedetto, AT; Hadziinikolau, Y, Goldberg, AJ, Dianselmo, A. "Measurement of the elastic modulus of fiber-reinforced composites used as orthodontic wires," J. Mater Sci Mater Med 1994; 5:214-218.

Fallis, DW; Kusy, RP "Variation in flexural Properties of photo-pultruded composite archwires: analysis of round and rectangular profiles," J. Mater Sci Mater Med, 2000; 11:683-693.

Watari, F; Yamagata, S, Imai, T; Nakamura, S. "The fabrication and properties of aesthetic FRP wires for use in orthodontics," J. Mater Sci, 1998; 33:5661-5664.

Zufall, SW; Kennedy, KC; Kusy, RP. "Frictional characteristics of composite orthodontic archwires against stainless steel and ceramic brackets in the passive and active configurations," J. Mater Sci: Mater Med 1998, 9:611-620.

H. Toyoizumi et al., "Fabrication of Aesthetic Wires with Flexural and Torsional Stiffness by Photo Curing Method", Journal of Japanese Society for Dental Materials, vol. 8, No. 6, pp. 429-440, 1999.

A.J. Goldberg et al., "The use of continuous fiber reinforcement in dentistry", Dental Materials, vol. 8, May 1992, pp. 197-202.

Robert P. Kusy, "A review of contemporary archwires: Their properties and characteristics", The Angle Orthodontist, vol. 67 No. 3, 1997, pp. 197-207.

* cited by examiner

FIBER REINFORCED COMPOSITE AND METHODS OF FORMING THE SAME

CROSS REFERENCE TO RELATED APPLICATIONS

This application claims priority from U.S. provisional patent application Ser. No. 60/436,466, which is entitled "Fiber Reinforced Composite Product with Flexible Longitudinal Geometry," filed Dec. 27, 2002, and is incorporated herein by reference.

FIELD OF THE INVENTION

The present invention relates to fiber reinforced composites and methods of forming such composites.

BACKGROUND OF THE INVENTION

Fiber reinforced composites (FRC) are useful, for example, as substitutes for metal materials. A fiber reinforced plastic wire can have strength comparable to a steel wire but only a fraction of the weight thereof. Fiber reinforced plastic wires can also be made more aesthetically pleasing to the eyes than steel wires do. They are therefore good replacements of metal wires used, for instance, in orthodontic treatments.

FRC wires can be produced by pultrusion. In a typical pultrusion process, a continuous reinforcement is first impregnated with curable resin and then pulled through a rigid die having a tunnel with a desired cross-section. The resulting long wire has a fiber inner core and a composite cover layer. The composite is cured in the die so that the wire can retain its cross-sectional shape. When cured, a soft material is hardened as chemical bonds are formed between atoms and/or molecules, which may occur for example under radiation. For example, monomers may be cured to produce polymers. After curing in the die, the resulting wire will retain a cross-section similar in size and shape to that of the die tunnel.

If desirable, the wire is subject to further processing such as longitudinal shaping and further curing. Post-pultrusion processing is commonly referred to as "beta-staging." Under known approaches, to shape a wire longitudinally, the composite is only partially cured in the die, separated from the die, longitudinally shaped, and then fully cured.

An example FRC pultrusion process is described in U.S. Pat. No. 5,869,178, issued on Feb. 9, 1999 to Kusy et al. ("Kusy"), the content of which is incorporated herein by reference.

However, the known approaches to producing pultruded FRC have certain drawbacks. For example, under these known approaches, fiber distribution in the resulting composite wire is often uneven when the fiber content is in a certain percentage range. The manufacturing process can be complicated as two curing steps are required if the composite wire is to be shaped longitudinally. It is also difficult to produce very thin wires as it is difficult to insert resins into a very small opening of the die. Further, pulling a fiber through a very thin tunnel may induce high stress in the fiber. A highly stressed fiber is easy to break, either during or after the pultrusion process.

Thus, there is a need for improved fiber reinforced composites and improved methods of forming fiber reinforced composites.

SUMMARY OF THE INVENTION

There is provided a process for forming a fiber reinforced composite in which a shrinkable die is used, so that a composite of fiber and resin placed in the die can be compressed by shrinking the die to form a desired transverse cross-section.

In accordance with an aspect of the present invention, there is provided a method of forming a fiber reinforced composite. The method includes placing a composite of fiber and resin in an elongate tunnel of a shrinkable die; shrinking the die to reduce the transversal cross-section of the tunnel along a longitudinal extent of the tunnel so as to compress the composite of fiber and resin in the tunnel; and curing the composite of fiber and resin.

There is also provided a process for forming a fiber reinforced composite in which a flexible die is used so that the die can be bent to shape the composite.

The method is particularly well suited to form wire for use in orthodontic treatment.

Other aspects, features and advantages of the invention will become apparent to those of ordinary skill in the art upon review of the following description of specific embodiments of the invention in conjunction with the accompanying figures.

BRIEF DESCRIPTION OF THE DRAWINGS

In the figures, which illustrate exemplary embodiments of the invention.

DETAILED DESCRIPTION

Figure 1:
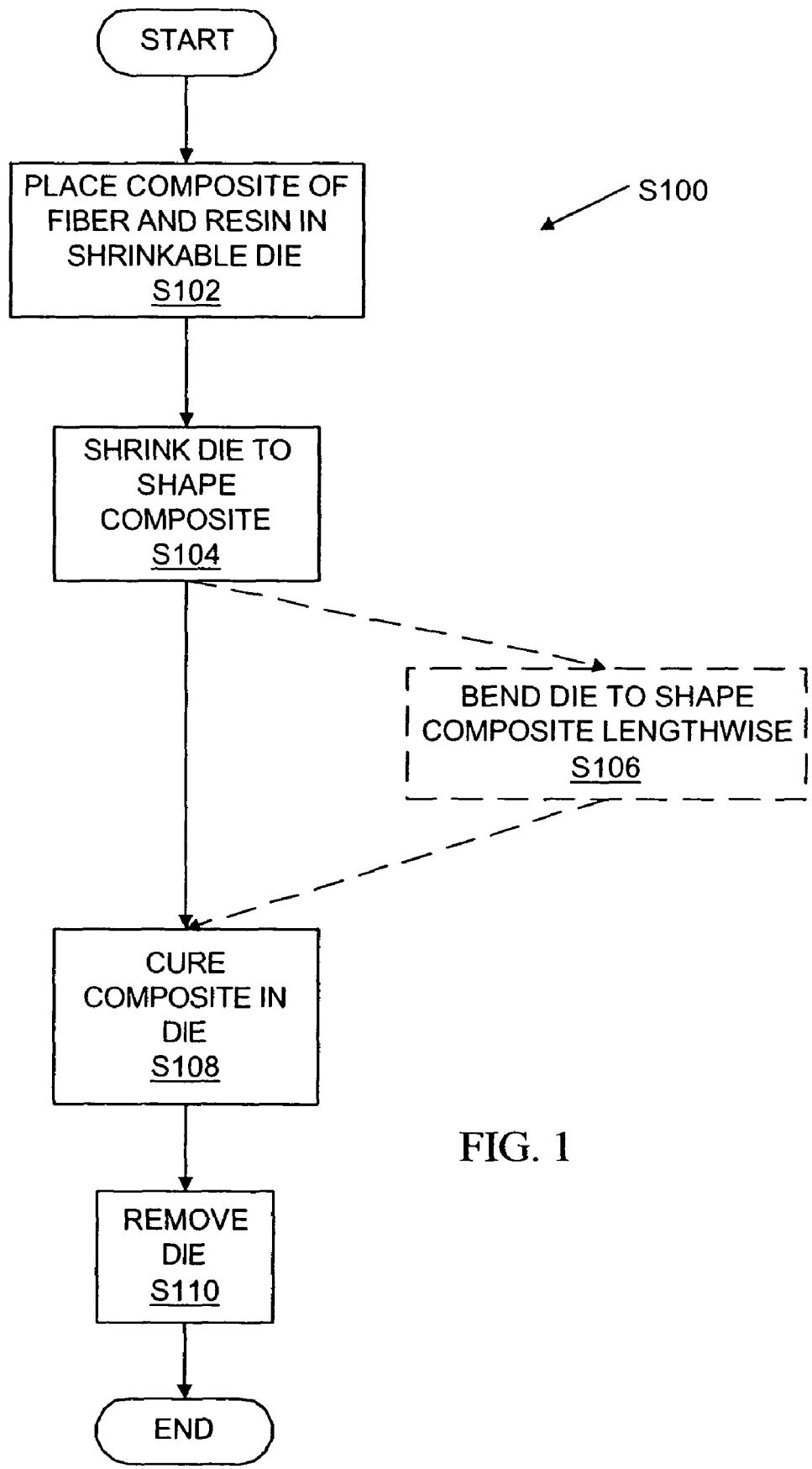
FIG. 1 is a flowchart illustrating a process of forming a fiber reinforced composite.

A flow diagram of an exemplary process S100 for forming a fiber reinforced composite is illustrated in FIG. 1. In process S100, a composite of fiber and resin is placed in an elongate tunnel of a shrinkable die (S102); the die is shrunk to reduce the transversal cross-section of the tunnel of the die along a longitudinal extent of the tunnel so as to compress the composite in the tunnel (S104); and the composite is then cured (S108). The composite may be fully or partially cured in the die so that it may retain its shape after it is separated from the die. The die may be shrunk sufficiently to compress the composite into a pre-determined transversal cross-sectional shape.

Optionally, the die may be bent lengthwise so as to shape the composite in the die (S106), prior to curing (S108). Optionally, the die could be bent lengthwise before shrinking (S104). Since both shrinking and bending can be performed before curing the composite, only one curing step is required.

After curing, the die is peeled from the composite in step S110.

As can be appreciated by a person skilled in the art, in process S100, the tunnel of the die does not have to have a small transversal cross-section initially, even when the desired cross-section of the composite wire is small. The composite of fiber and resin can therefore be placed in the die with an initially large tunnel cross-section. Since the composite is compressed into the desired cross-sectional shape under mainly radial pressures, the stress in the resulting product is small. Further, since the tunnel of the shrunk die can have a size substantially smaller than its pre-shrunk size, it is easier to insert resins into the die initially even if the transversal cross-section of the final product is small.

Figure 2:
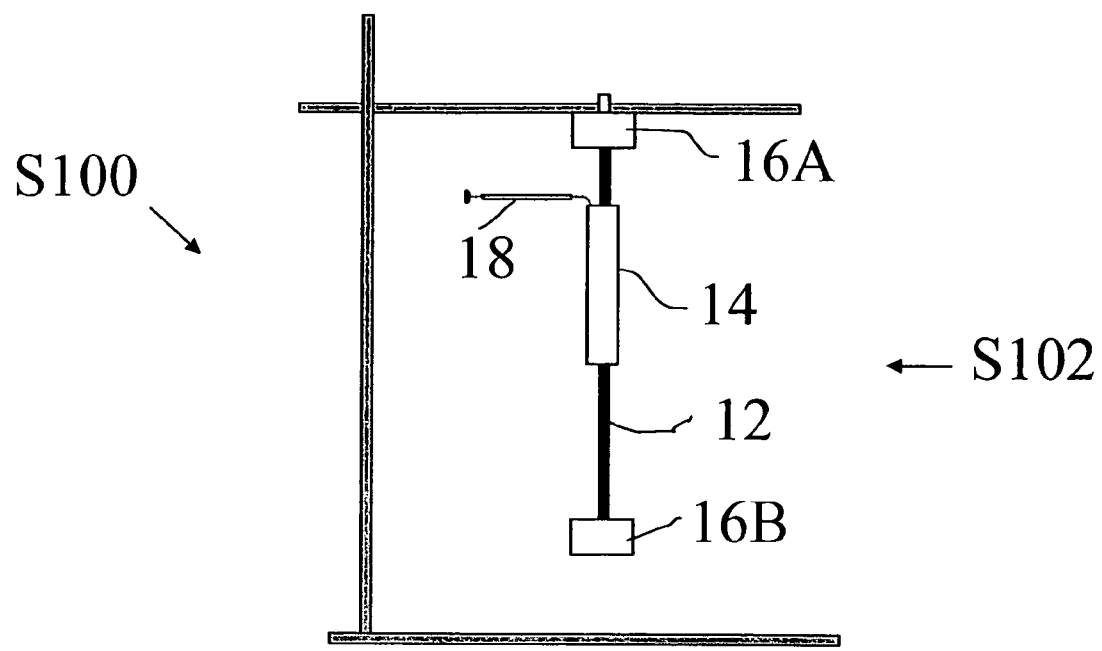
FIGS. 2 to 4 schematically illustrate a process incorporating the processes of FIG. 1.
Figure 3:
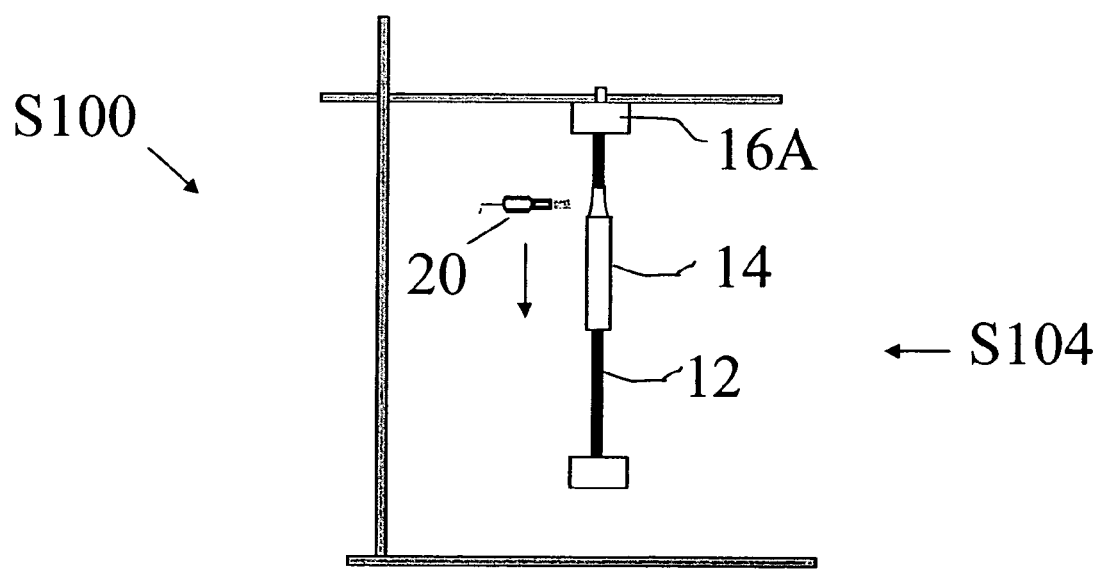
Figure 4:
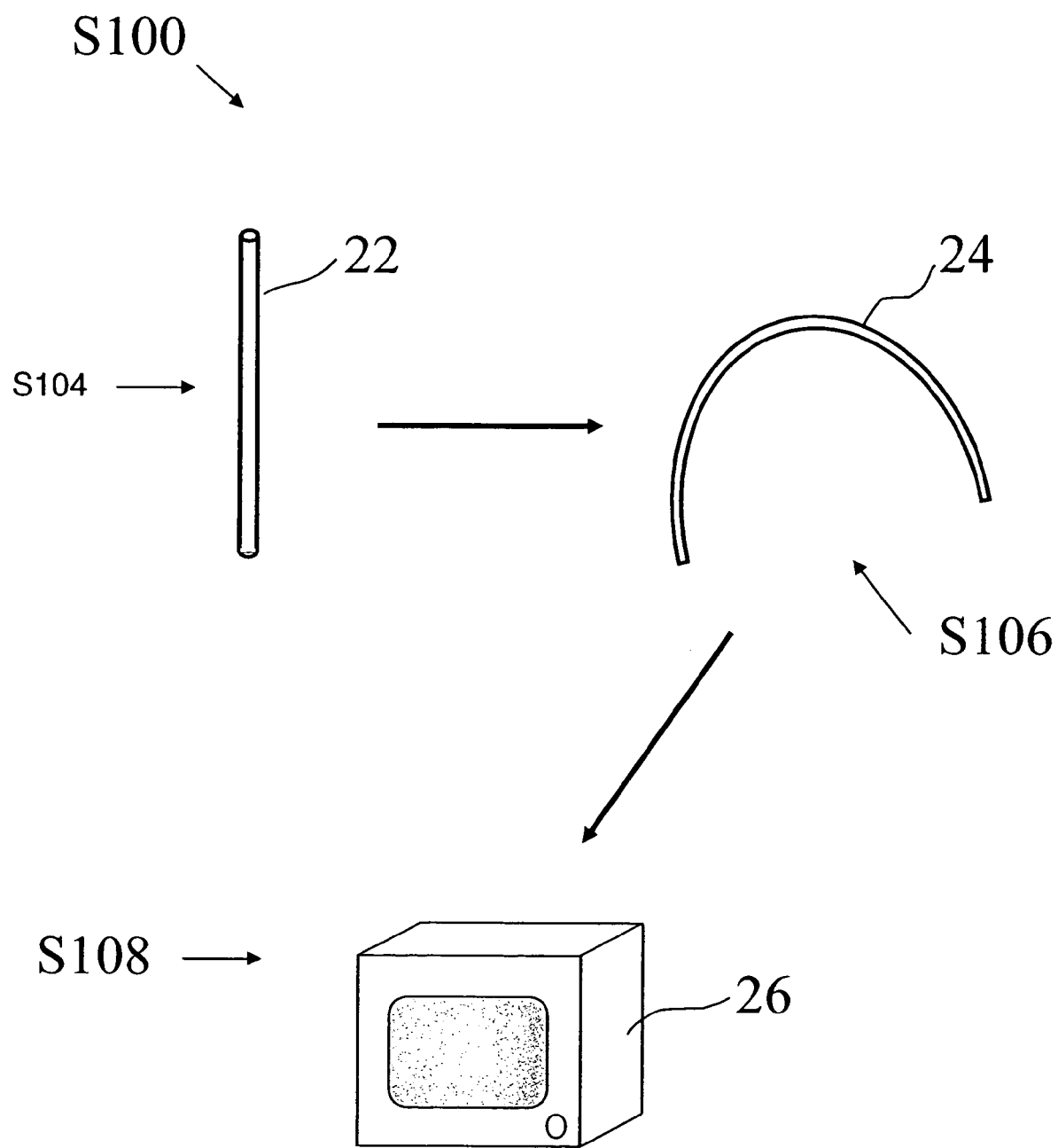

FIGS. 2 to 4 schematically illustrate an exemplary physical embodiment of process S100 for producing a fiber reinforced composite wire having a desired size and shape.

As illustrated in FIG. 2 a section of composite fiber 12 impregnated with uncured resins is placed into an elongate tunnel (not shown) of a shrinkable and flexible die 14 (S102). Impregnated fiber 12 includes a bundle of fiber strands (yarns) and resins impregnated thereon. The fibers may be impregnated with the resins in suitable manners known to persons skilled in the art, such as those used in conventional pultrusion processes.

For unidirectional composites, each of the fiber strands has a length longer than the length of the tunnel of die 14. The bundle of fiber strands may be impregnated before or after it is placed into the tunnel of die 14. For other composites, fibers may be shorter than the tunnel of die 14.

Impregnated fiber 12 can include one strand or filament or a bundle of strands or filaments of fiber materials. Suitable fiber materials include metals, ceramics, glasses, polymers, and the like. For example, suitable fiber materials include boron, aluminium, quartz, graphite, polyethylene, nylon, and any combination thereof. Commercially available fiber yarns or rovings may be used. The fiber yarns or rovings may be preformed using known textile manufacturing techniques, such as brading. The fibers may contain one or more other ingredients, such as coupling agents, primer agents, and sizing agents, for improving the properties of the product or for facilitating the manufacturing process, such as improving the bonding between the resin and the fibers. Fibers can be chosen depending on the intended purpose for the final product. For example, for producing aesthetic composite product such as orthodontic wire, glass fiber may be preferable.

The resins used may include any suitable resins used in conventional pultrusion processes. Monomer resins may be used. Exemplary suitable monomer materials include acrylic monomer, acrylate monomer, epoxy monomer, carbonate monomer, or any combination thereof. The resins may contain a suitable polymerization initiator. For producing orthodontic wires, Bis-GMA based dental resins, such as Metafil FLo™ supplied by Sun Medical, may be used. These resins have been commonly used in dentistry and are biocompatible in an oral environment. Further, they can form products with an aesthetically pleasing appearance.

The tunnel of die 14 is longitudinally straight and has a uniform cross section. The tunnel of die 14 for receiving fiber and resin may have any desired shape suitable for producing the desired final product. This allows formation of a wire having a cross-section that can be virtually any shape depending on the application. In the depicted embodiment, the cross-section is circular.

The initial cross-section of the die tunnel can have a size substantially larger than the desired size of the cross-section of the resulting composite wire.

Die 14 is oriented so that the tunnel is vertically disposed. However, the tunnel may be otherwise disposed. The vertical orientation is advantageous because the gravitational force is normal to the transversal cross-section of the tunnel and does not contribute to the transverse force exerted on the strands in the tunnel.

Preferably die 14 is made of material that may contract in size (or shrink) so as to constrict the tunnel formed therein. As well, die may be formed of a material that may be bent or flexed along its length. The shrinkable and/or flexible materials suitable for formation of die 14 are known to persons skilled in the art and are readily available. For example, the die may be formed with temperature sensitive material that shrinks in response to heat. One suitable material for such a die is polyolefin. An example of a suitable die material is the heat-shrinkable tubes available under the tradename SUMI-TUBE™. Other suitable polymers include polytetrafluoroethylene (PTFE), perfluoroalkoxy (PFA), fluorinated ethylene polymer (FEP), polyvinydene Fluoride (PVDF), and polyethylene terephthalate (PET).

Fiber 12 may be pulled into and through the tunnel of die 14, such as is done in conventional pultrusion processes. Fiber 12 may then be cut into a desired length. A portion of fiber 12 is exposed at each end of die 14. Each exposed portion can be, for example, two inches long. Two weights 16A and 16B may be respectively tied to one or other of the two exposed end portions. The weights 16A and 16B pull the fiber strands so that fiber 12 is straightened.

Optionally additional resin can be injected into die 14 with an injecting device such as syringe 18 to further fill the die tunnel.

Die 14 is then shrunk by heat treatment using heat gun 20 so as to cause the tunnel to contract and die 14 to compress fiber 12 and resin therein into a desirable cross-sectional shape (S104), as illustrated in FIG. 4.

It may be advantageous to shrink die 14 gradually from top to bottom along the length of the tunnel of die 14 as gravity facilitate the removal of excessive resin. The temperature required to shrink die 14 may vary depending on the die material. A heat gun producing hot air with a temperature of about 180° C. has been found suitable for shrinking a polyolefin die. Die 14 preferably shrinks uniformly so that the cross section of its tunnel retains its general shape, but decreases in size. The contracting tunnel exerts a force on the uncured composite therein, thereby compressing the composite and causing it to assume a cross-section shape that is the shape of the tunnel.

Optionally, impregnated fiber 12 and die 14 can be placed under vacuum together after a section of die 14 has been shrunk to remove any gas entrapped inside the tunnel before completely shrinking die 14. For example, the top 10% of die 14 may be shrunk first before vacuuming and further heating.

As illustrated in FIG. 4, after die 14 is completely shrunk to the desired size a section 22 can be cut out from the die and the impregnated fiber assembly (S104). Section 22, including die 14 can then be bent along its length into a desired profile 24 (S106), for example, with an arch-shaped mould. Profile 24 can then be cured in a curing chamber 26 (S108). Profile 24 can be cured in manners known to a person skilled in the art, such as by radiation. For example, profile 24 may be cured with UV-light for about 90 seconds. After profile 24 is cured, die 14 is separated from the fiber reinforced composite. A small cut/slit may be made at one end of die 14 and it may be peeled from the cured composite and discarded The resulting fiber reinforced composite wire may be used in a variety of applications. For example, it may be used in orthodontic treatments.

Figure 5:
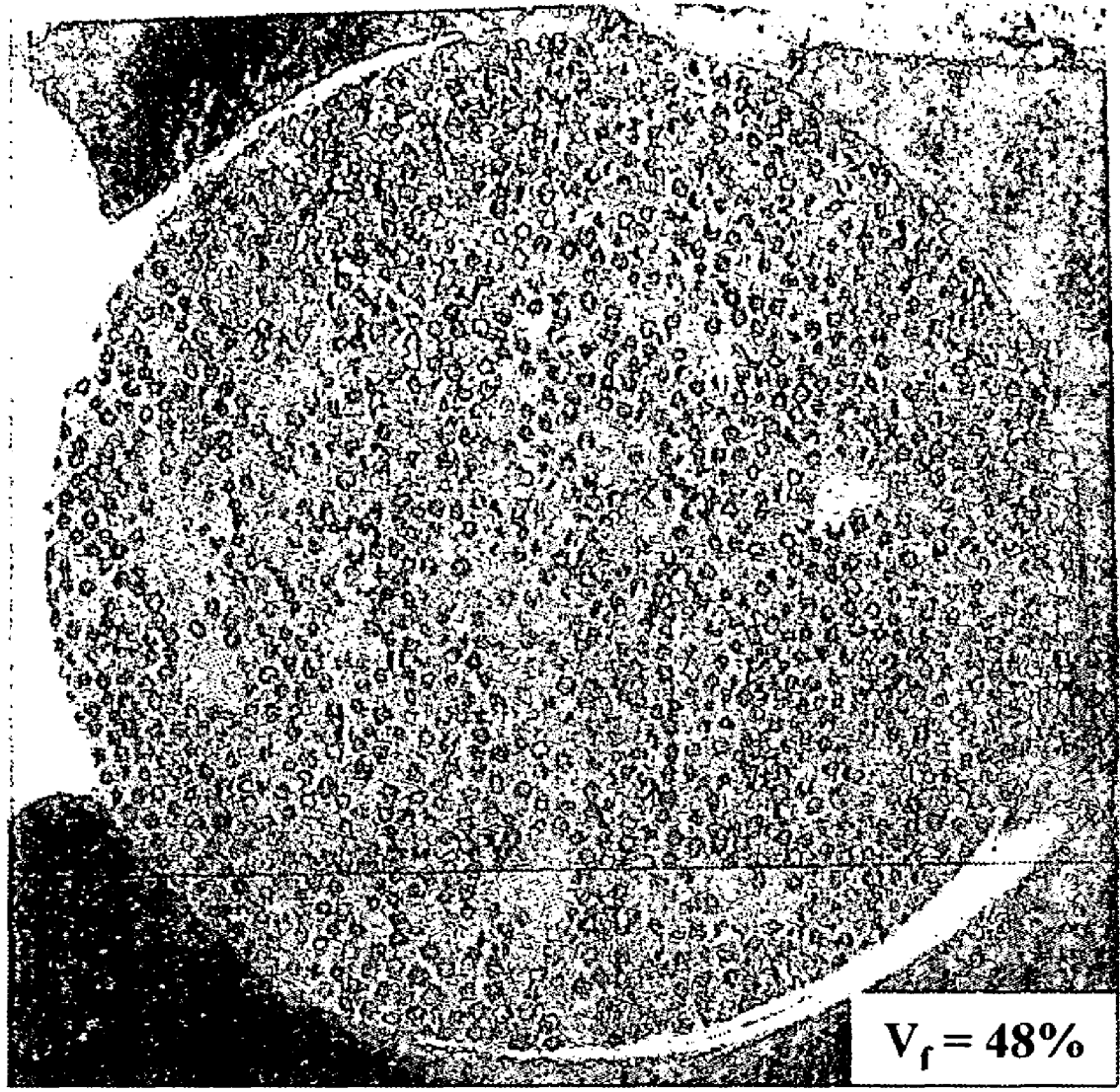
FIG. 5 is a cross-sectional view of a fiber reinforced plastic wire produced by the process illustrated in FIGS. 2 to 4.

The cross-section of a fiber reinforced composite wire produced as described above is shown in FIG. 5. As can be seen, the example wire has a substantially circular cross-sectional shape. The example wire has a glass fiber content of 48% by volume. As can be seen, glass fibers are evenly distributed. As is known to a person skilled in the art, in wires produced by conventional pultrusion processes, fiber distribution is often uneven when the fiber content is in a certain range, as shown in FIGS. 6a to 6f of Kusy and discussed therein.

The resulting composite may contain a matrix and reinforcement. The reinforcement is formed of the fiber, while the cured resins form a polymer matrix. The resulting polymer may be a homopolymer, copolymer, terpolymer, and blends or modifications thereof. Copolymers include block, graft, random and alternating copolymers. The polymers may have various structures, such as isotactic, syndiotactic and random molecular configurations, which can be either linear or cross-linked.

Depending on the input fiber and resin, the resulting polymer product can be wholly or partially absorbable, non-absorbable, dissolvable, or biodegradable.

Figure 6:
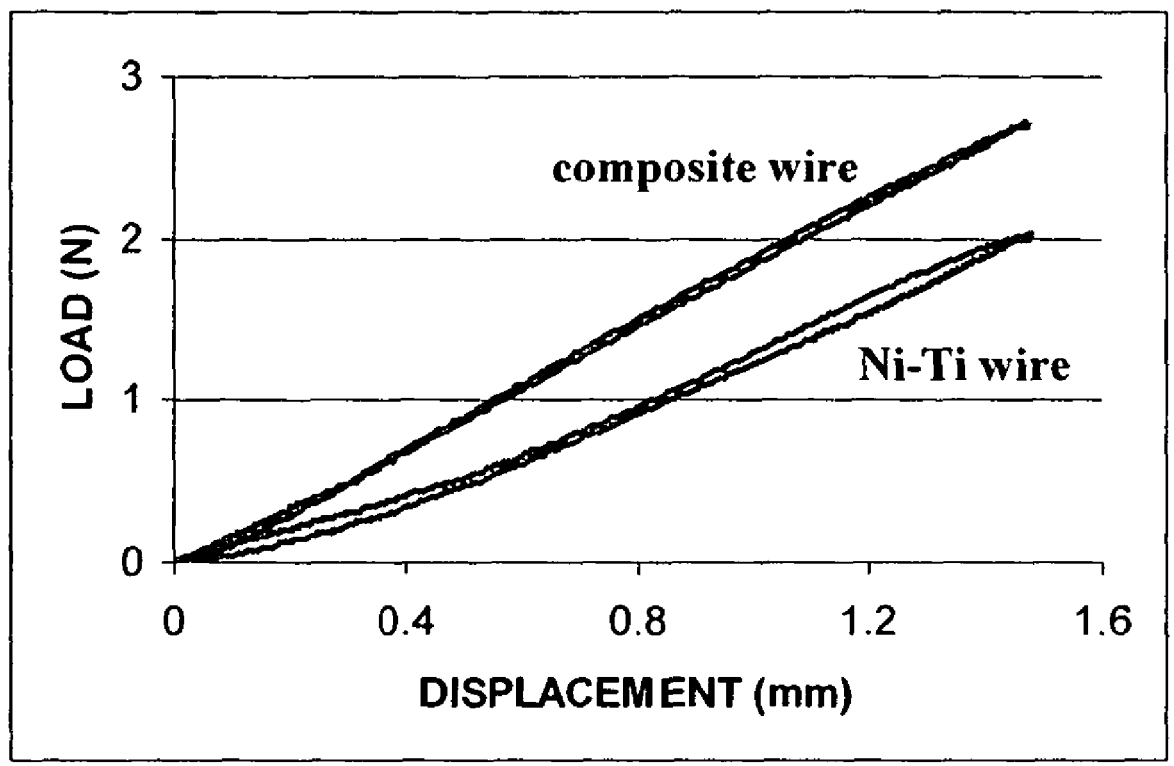
FIG. 6 is a graph comparing the properties of a composite wire with a metal wire.

Test results show that fiber reinforced composite orthodontic wires produced with process S100 can meet the specifications of international standards such as the ASTM D 790 standard. The fiber reinforced composite orthodontic wires have similar or improved mechanical properties in comparison with conventional metal orthodontic wires such as Ni-Ti wires sold under the tradename Reflex™ by TP Orthodontics, Inc. As shown in FIG. 6, a composite wire can withstand higher load than a similarly sized Ni-Ti wire having 0.45 mm (0.018 inch) diameter. The composite wire was formed of a Bis-GMA matrix based dental resin, Metafil Flo B12, from Sun Medical reinforced with a bundle of several E-glass fiber yarns, each containing 200 fiber filaments (the filament diameter=9 µm, Unitica Glass Fiber Co. Ltd, Japan. The fiber volume fraction was 48% and the diameter of the wire was 0.5 mm. As can be seen, the composite wire also showed good recovery upon unloading.

Advantageously, with a shrinkable die, the die tunnel can have a large initial cross-section. As a result, it is easy to insert the fiber and resin into the tunnel and the stress in the fiber resulting from insertion of the composite and removal of the wire can be reduced. Very thin composite wires can thus be formed. Further, multiple strands of fiber can be evenly distributed in the formed composite, thus improving the mechanical properties of the composite. When a flexible die is used, the die can be bent to shape the composite wire before the wire is separated from the die. Only one curing step is required to form an arched wire.

Modifications to the exemplary embodiment described above are possible, as will be understood and appreciated by persons skilled in the art.

For example, die 14 can be horizontally arranged instead of vertically. Die 14, with fiber and resin in it, may be shrunk first then shaped longitudinally or shaped longitudinally first then shrunk. Die 14 can also be shrunk in other manners. Heat gun 20 may be replaced by other heating devices, such as those using electromagnetic radiations. The whole assembly of impregnated fiber 12 and die 14 may be placed in a heating chamber.

The fiber content may vary depending on the desired mechanical properties, as will be understood by persons skilled in the art. Generally, increasing fiber content can increase the mechanical strength and stiffness of the final wire. Braided fibers may be used as the reinforcement fiber. Similarly, Short fibers or particulate reinforcement can also be used and inserted into die 14. Pigments may be added to the resin before shrinking die 14, to, for example, give the final product a desired colour.

Although only exemplary embodiments of this invention have been described above, those skilled in the art will readily appreciate that many modifications are possible. The invention, rather, is intended to encompass all such modification within its scope, as defined by the claims.

What is claimed is:

1. A method of forming an orthodontic wire, comprising, in combination, the steps of:
    placing a composite of fiber and resin in a shrinkable die having a length and a top and a bottom, wherein the die is formed of a material that shrinks in response to heat;
    shrinking a section of the die;
    placing the die containing the composite in a vacuum prior to completely shrinking the die;
    heating the die containing the composite to completely shrink the die, wherein the composite is compressed to a pre-determined transversal cross-sectional shape, and heating occurs gradually along the length of the die, such that shrinking occurs at one of the top and the bottom prior to occurring at the other of the top and the bottom;
    bending the die containing the composite to a desired profile;
    curing the composite; and
    separating the cured composite from the die.

2. The method of claim 1, wherein the die has at least one opening, and excess resin can leave the die during the step of heating the die.

3. The method of claim 2 further comprising curing the composite in the die so that the composite retains the pre-determined transversal cross-sectional shape after the step of separating the composite from the die.

4. The method of claim 1 wherein the pre-determined transversal cross-sectional shape of the composite is determined by the shrunk die.

5. The method of claim 1 wherein the fiber comprises a plurality of elongated strands each having a length longer than the length of the die.

6. The method of claim 5, wherein the step of placing comprises pulling the plurality of strands into and through the die.

7. The method of claim 6, further comprising pulling on the plurality of strands in directions towards the top of the die and towards the bottom of the die.

8. The method of claim 6, further comprising impregnating the plurality of strands with the resin prior to the pulling.

9. The method of claim 8, further comprising, after the pulling, adding additional resin to the die so as to further fill the die.

10. The method of claim 1, wherein the composite is placed in the die by placing the fiber in the tunnel of the die, pulling on the fibers to straighten the fibers, and thereafter adding resin in the die.

11. The method of claim 1, wherein the step of bending comprises bending the die to shape the composite into an arched wire suitable for use in an orthodontic treatment.

* * * * *